(12) United States Patent
Wood

(10) Patent No.: US 8,960,655 B2
(45) Date of Patent: Feb. 24, 2015

(54) COMPACT FLEXURE BEARING SPRING FOR SPRINGING MULTIPLE BODIES

(71) Applicant: Sunpower, Inc., Athens, OH (US)

(72) Inventor: James Gary Wood, Albany, OH (US)

(73) Assignee: Sunpower, Inc., Athens, OH (US)

( * ) Notice: Subject to any disclaimer, the term of this patent is extended or adjusted under 35 U.S.C. 154(b) by 0 days.

(21) Appl. No.: 13/906,774

(22) Filed: May 31, 2013

(65) Prior Publication Data
US 2014/0353891 A1    Dec. 4, 2014

(51) Int. Cl.
*H01H 35/34*    (2006.01)
*F16F 1/18*    (2006.01)
*F16F 1/02*    (2006.01)

(52) U.S. Cl.
CPC ..................................... *F16F 1/027* (2013.01)
USPC .......................................... 267/159; 267/161

(58) Field of Classification Search
USPC .................. 267/159, 161, 160, 164
See application file for complete search history.

(56) References Cited

U.S. PATENT DOCUMENTS

| | | | | |
|---|---|---|---|---|
| 5,149,150 A | * | 9/1992 | Davis | 267/159 |
| 5,269,499 A | * | 12/1993 | Schwab | 267/159 |
| 5,361,243 A | * | 11/1994 | Kasahara | 369/44.15 |
| 5,522,214 A | | 6/1996 | Beckett et al. | |
| 5,525,845 A | | 6/1996 | Beale et al. | |
| 6,050,556 A | * | 4/2000 | Masuda et al. | 267/161 |
| 6,056,519 A | | 5/2000 | Morita et al. | |
| 8,028,409 B2 | | 10/2011 | Hanes | |
| 2002/0089106 A1 | * | 7/2002 | Horng | 267/161 |
| 2005/0135946 A1 | | 6/2005 | Kang et al. | |
| 2008/0191399 A1 | | 8/2008 | Chang | |
| 2009/0007560 A1 | | 1/2009 | Inoshiri | |

\* cited by examiner

*Primary Examiner* — Christopher Schwartz
(74) *Attorney, Agent, or Firm* — Frank H. Foster; Kremblas & Foster

(57) ABSTRACT

A flexure bearing "planar" spring that can spring multiple, independently reciprocating bodies, such as springing each body to a third body or springing a first body to a second body and springing the second body to a third body. A primary arm set of primary spring arms are separated from each other by openings and extend inwardly from a peripheral frame along a non-radial primary path progressing inwardly toward a central axis and angularly about the central axis. A secondary arm set of at least one secondary spring arm extends along a non-radial secondary path progressing radially and angularly about the central axis. Each secondary arm is interposed in an opening between the primary arms allowing the primary arms and the secondary arms to pass by each other through the openings without interfering with each other.

11 Claims, 5 Drawing Sheets

COMPACT FLEXURE BEARING SPRING FOR SPRINGING MULTIPLE BODIES

BACKGROUND OF THE INVENTION

This invention relates to mechanical springs and more particularly relates to improvements in a particular type of mechanical spring that has been used in the past for resonating the displacer of a free piston Stirling engine or cooler within its casing but its improvement permits the spring to resonate multiple different bodies instead of only one.

The term "flexure bearing spring" is adopted to refer to a type of spring that has been referred to in the prior art by various terms, including planar spring, flexure bearing, and flat spiral spring. Examples of such springs are shown in U.S. Pat. Nos. 5,522,214 and 8,028,409 and U.S. published application US 2008/0191399. Flexure bearing springs are commonly used to support reciprocating bodies such as the piston and displacer of a free piston Stirling engine or cooler. A typical flexure bearing spring has a surrounding peripheral frame with a central axis that is perpendicular to the frame and a set of arms extending inwardly from the peripheral frame. The arms do not extend inwardly along a radial of the axis but instead each arm progresses inwardly along a more or less spiral-looking path. The inner ends of the arms are ordinarily joined together within the peripheral frame where they are attached to a body that reciprocates along the central axis. The flexure bearing spring is a bearing in the sense that it supports the body against radial movement away from its axis of reciprocation. It is a flexure in the sense that its arms are cantilevered springs that flex during reciprocation of the body. It is a spring in the sense that its arms are elastic and resilient and therefore can receive, store and return energy. The arms are equi-angularly spaced about the central axis and preferably the arms are identical because those characteristics permit the radial forces between the spring and the reciprocating body to have a vector sum that is a resultant of essentially zero radial force when the arms are radially centered. If the arms are off center, they apply a centering force returning an axially reciprocating body to the axis. Because of the centering forces and the absence of side forces when centered, the body is maintained on the axis but can reciprocate along the axis in resonance. It is not necessary that the arms extend along a mathematically correct spiral. In fact some flexure bearing springs have linear arms with angularly intersecting segments. The arms of flexure bearing springs extend along a path progressing radially inwardly toward the central axis and angularly about the central axis so that the arms are longer than if they were radial and therefore each arm applies a smaller radial side force than would radial arms and can translate further along the axis during reciprocation. The particular contour of the arms as they progress from the peripheral frame inwardly toward the axis is principally a matter for the judgment of the designer and often requires trial and error experimentation.

Because a flexure bearing spring functions as a spring and maintains a body attached to it on a central axis, it is often used to support and resonate the displacer piston of a free piston Stirling machine. The displacer is attached to the spring by a connecting rod and reciprocates along its central axis within the displacer cylinder at the operating frequency of the machine. The spring is also attached to the casing of the Stirling machine so that it forms a spring connected between the displacer and the casing. In order to increase the spring constant (stiffen the spring), multiple identical flexure bearing springs are stacked together and all are connected to the same connecting rod and to the casing.

For many free piston Stirling machines the power piston of the Stirling machine can be resonated using only the Stirling Cycle pressure swing so no separate spring is used to resonate the power piston. However, for some free piston Stirling machines it would be desirable to add some mechanical spring to the piston, either to statically axially center the piston, and/or to make the engine run faster at a given pressure. But in practice this is seldom done because the addition of a second spring for the power piston adds mechanical complexity, additional parts and weight and significantly increases the length to the machine. The reason is that both the displacer and the power piston reciprocate out of phase and along the same axis. Therefore care must be taken to avoid interference, such as collision, between the two springs. Consequently, with two pistons reciprocating along the same axis and each piston linked to a different flexure bearing spring, the two springs must be axially displaced apart to avoid interference between the springs. Typically the added power piston spring is axially displaced by approximately the piston amplitude away from the displacer spring to avoid interference during operation. As a result, the length of the Stirling machine must be increased by the length of the spacing between the springs. That means that the size of the outer casing must be increased as well as the length of the power piston connecting rod. This increased size and resulting increase in weight make the Stirling machine larger and heavier thereby reducing its power to weight and power to volume ratios.

It is therefore an object and feature of the invention to provide a flexure bearing spring that is capable of springing to a casing two different coaxially reciprocating bodies, such as the power piston and displacer of a free piston Stirling machine, without requiring the lengthening of the machine beyond the length required if only one body were sprung to the casing.

Another object and feature of the invention is to provide a flexure bearing spring that is capable of springing two different coaxially reciprocating bodies, such as the power piston and displacer of a free piston Stirling machine, to each other and also springing one of them to the casing.

BRIEF SUMMARY OF THE INVENTION

The invention is a compact, preferably planar, flexure bearing mechanical spring that can attach to at least two different, independently reciprocating bodies to independently spring each body to the casing or spring a first body to the casing and the other body to the first body. The spring is formed with at least two sets of spring arms. Each set of spring arms is interposed in openings between the spring arms of the other set. This allows the arms of each set of spring arms, during reciprocation, to independently pass through the openings between the arms of the other set. Therefore, the spring arms of each set are free to move through the common plane of the spring allowing for a compact axial arrangement. One set of spring arms can have one, two, three or more spring arms.

Figure 1:
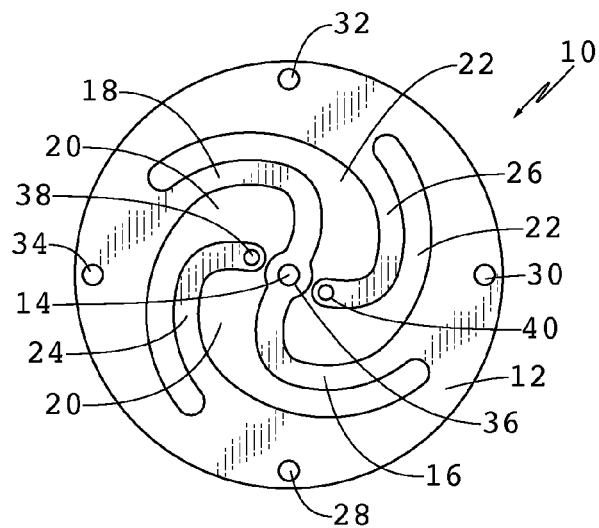
FIG. 1 is a top plan view of an embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The prior art has developed a planar spring that has one set of spiral-looking arms and is used for providing a spring force to resonate a body. The invention adds at least one additional set of additional arms so that a second, separate body can also be resonated by the same spring. The additional arms can be from "ground", such as a casing, in which the additional set of arms is essentially a separate, second spring to ground for the second body. Alternatively, the second set of arms can be connected to the moving part of the first set of arms in which case a "relative" spring is created which is a spring connected between the two moving bodies. Additional sets of arms can also be added.

Figure 2:
FIG. 2 is a side view of the embodiment of FIG. 1 as well as a side view of the embodiments of FIGS. 3-7.

FIG. 1 illustrates a flexure bearing spring 10 embodying the invention. The spring 10 of FIG. 1 is used to independently connect through a spring each one of two bodies to a third body, such as a casing, and therefore functions as two separate springs. The spring 10, like all the illustrated embodiments of the invention, is planar as illustrated in its side view of FIG. 2. The spring 10 has a peripheral frame 12 and a central axis 14 perpendicular to the peripheral frame 12 (and perpendicular to the plane of the drawing). The spring 10 has a primary arm set comprising a plurality of primary spring arms 16 and 18 that are separated from each other by openings 20 and 22. The spring 10 also has a secondary arm set comprising secondary spring arms 24 and 26. The secondary spring arms 24 and 26 are interposed in the openings 20 and 22 between the primary arms 16 and 18

As seen in FIG. 1 but also true of the other illustrated embodiments of the invention, the spring 10 is a single sheet of resilient material and all the arms are smoothly blended into the peripheral frame 12. Consequently, there is no physical or structural boundary between the arms and the surrounding peripheral frame 12. However, the peripheral frame 12 may be considered to be an annular frame to which the arms are attached although the frame could be a square, an ellipse or another polygon or shape. A series of holes 28, 30, 32 and 34 extend through the peripheral frame 12 so that fasteners can be used to attach the spring 10 to a "ground" body such as a casing or an internal support within a casing. The frame 12 is preferably a portion of a single unitary body that is integral with the spring arms. However, the peripheral frame can be formed in segments with each frame segment attached to one or more spring arms. In the latter case, each segment becomes fastened rigidly to a third body, such as a casing, so that the third body holds the frame segments and their arms together as a flexure bearing spring. Similarly, each spring arm could be rigidly attached to the third body so that the third body functions as the frame that supports the arms.

Each of the two primary arms 16 and 18 extend inwardly from the peripheral frame 12 along a non-radial primary path progressing inwardly toward the central axis 14 and angularly about the central axis 14 to a primary end connector 36. In the embodiment of FIG. 1, the arms of primary set of arms 16 and 18 are joined together at a single, central end connector 36.

The preferred end connector for embodiments of the invention is a hole near or at an end of the arm so that a fastener can be inserted through the hole to attach the end of the arm to a body. Each arm of the flexure bearing spring has an end connector. The term "end connector" at the end of the arms is a structural feature that is formed to connect the end of the arm to the body to which the arm will apply its spring forces. Of course other types of end connectors are possible, such as slots or posts. The end connectors could be welds, although that is not preferred. The arms may be widened around some or all of the end connector holes for additional strength. As will be seen in the illustrated embodiments, all the arms of one set of spring arms can be joined together and terminate in a single, central, end connector. Alternatively, each of the arms can terminate in its own different end connector so that there is one end connector for each arm. The use of a single central end connector facilitates connection of its associated arms to the reciprocating body by a single fastener. However, in embodiments having a different end connector at the end of each arm, each body to which the spring forces are to be applied can be connected to the body by one fastener for each arm. It is anticipated that each set of arms are either directly connected together by a common central connector, or the arms of the set are connected together by their attachment to the same body, such as a connecting rod.

Each of the arms 24 and 26 of the secondary arm set extend along a non-radial secondary path progressing radially and angularly about the central axis 14 to a secondary end connector 38 and 40. In the embodiment of FIG. 1, each of the secondary arms 24 and 26 progresses from the peripheral frame 12 radially inwardly and angularly about the central axis.

The shape and orientation of the spring arms are not limited to any particular shape or orientation. The various spring arms of embodiments of the invention are described as progressing inwardly, outwardly or radially toward or from the central axis or a central connector or a peripheral frame AND angularly about the central axis. Although there is no specific shape or orientation that is required for the spring arms, these terms are believed to describe their characteristics. The term "progressing" is used to indicate a direction of imaginary travel along a spring arm. The direction of travel has two components, a radial component and an angular component. The angular component is clockwise or counterclockwise. The arms do not align along a radial and therefore they are non-radial. Some of the spring arms are described as progressing inwardly from the peripheral frame with the two components of direction. That means that imaginary travel from the peripheral frame along the spring arm moves both inwardly toward the central axis and angularly as the travel progresses along the arm. Some of the spring arms are described as progressing outwardly from a central connector with the two components of direction. That means that imaginary travel from the central connector along the spring arm moves both outwardly from the central axis and angularly as the travel progresses along the arm. The inward and outward components of travel can also be described as radial components of travel direction. Embodiments of the invention preferably have curved arms that progress continuously inwardly or outwardly as they progress angularly. However, the arms can have linear segments and the segments can progress in increments along either or both of the component direction of travel but the sum of the segment travel along the arm as a whole is along the two components of direction.

Preferably, when a set of spring arms has two or more arms, the spring arms are equi-angularly spaced around the central axis. For example, if there are two arms in a set of arms, they are spaced by 180°. If there are three arms in a set they are spaced 120°. Preferably, all arms in a set progress angularly in the same manner with similar contours as they progress from the peripheral frame toward the center or from the center toward the peripheral frame.

Returning to FIG. 1, the end connector 36 of the primary arms 16 and 18 is easily connected to a displacer connecting rod or other link to a Stirling machine displacer. Similarly the end connectors 38 and 40 are connected to a piston connecting rod, such as through a yoke. With the peripheral frame 12 fixed to a Stirling machine casing, the displacer and piston of a Stirling machine reciprocate independently with the secondary arms 24 and 26 flexing and passing through the plane of the spring 10 in the openings between the primary arms 16 and 18. Similarly, the primary arms 16 and 18 also are free to flex and pass through the plane of the spring in the openings between the secondary arms 24 and 26.

Figure 3:
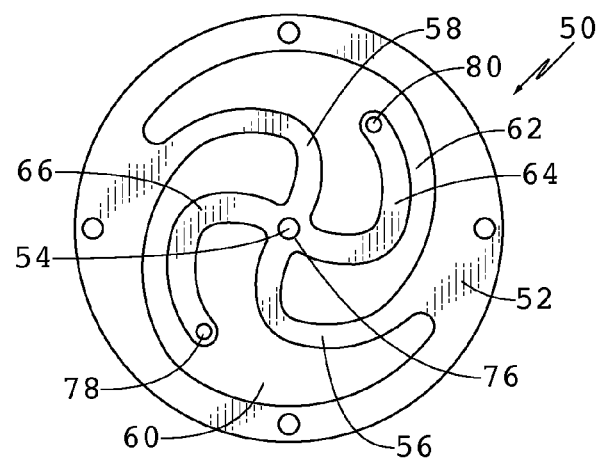
FIG. 3 is a top plan view of an alternative embodiment of the invention.

FIG. 3 illustrates an alternative flexure bearing spring 50 embodying the invention. The spring 50 of FIG. 3 is used to connect a first reciprocating body to a second reciprocating body through one set of spring arms and to also independently connect one of the two bodies to a third body through another set of spring arms. For example, the embodiment of FIG. 3 can spring a displacer to a Stirling machine casing and also spring the displacer to the piston of the Stirling machine.

Referring to FIG. 3, the flexure bearing spring 50 has a peripheral frame 52, with fastener mounting holes as in FIG. 1, and a central axis 54 perpendicular to the plane of the peripheral frame 52 (and perpendicular to the plane of the drawing). The spring 50 has a primary arm set comprising two primary spring arms 56 and 58 that are separated from each other by openings and joined together at a central connector 76. The spring 50 also has a secondary arm set comprising two secondary spring arms 64 and 66. The secondary spring arms 64 and 66 are interposed in the openings 60 and 62 between the primary arms 56 and 58. Each secondary arm 64 and 66 extends outwardly from the central connector 76 to respective end connectors 78 and 80, one end connector at or near the outer end of each secondary arm. The secondary arms 64 and 66 are equi-angularly spaced about the central axis 54.

The end connector 76 of the primary arms 56 and 58 is easily connected to a displacer connecting rod or other link to a Stirling machine displacer. Similarly the end connectors 78 and 80 are connected to a piston connecting rod, such as through a yoke. With the peripheral frame 52 fixed to a Stirling machine casing, the displacer and piston of a Stirling machine reciprocate with the secondary arms 64 and 66 forming the spring between the displacer and piston and flexing and passing through the plane of the spring 50 in the openings 60 and 62 between the primary arms 56 and 58. Similarly, the primary arms 56 and 58 form a spring between the casing and whichever one of the displacer or piston are connected to the end connector 76. The primary arms 56 and 58 are free to flex and pass through the plane of the spring between the secondary arms 64 and 66.

The remaining figures illustrate alternative embodiments of the invention. They all have many structural features that are the same as the structural features of the embodiments in FIGS. 1-3 and consequently there is no reason to repeat the descriptions of the identical features. Therefore, the description of FIGS. 4 through 14 will be directed to their structural features that are different from previously described structural features.

Figure 4:
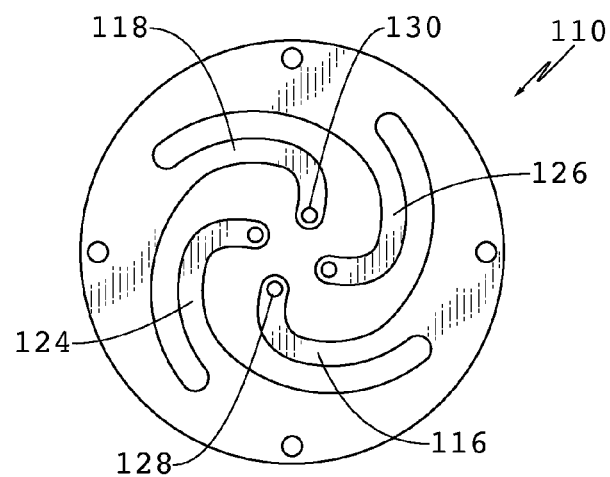
FIG. 4 is a top plan view of an alternative embodiment of the invention.

FIG. 4 illustrates a spring 110 that is like the spring of FIG. 1 except that the primary arms 116 and 118 do not terminate in a central connector. Instead, the primary arms 116 and 118 each have their own end connector, 128 and 130 respectively. Therefore, instead of connecting one body, such as a displacer connecting rod, to a single end connector, it can be connected to the two end connectors 128 and 130, such as by a yoke.

Figure 5:
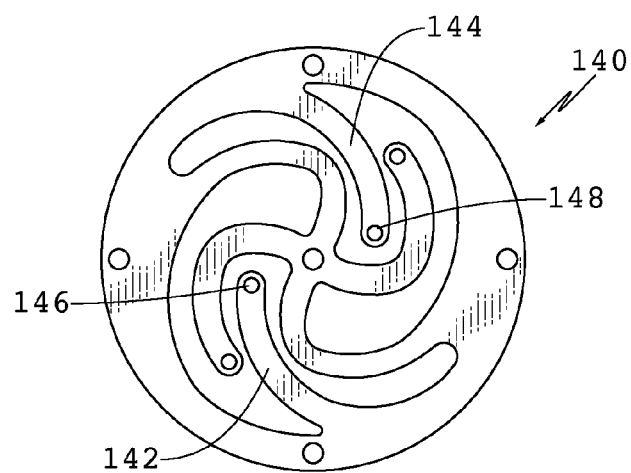
FIG. 5 is a top plan view of an alternative embodiment of the invention.

FIG. 5 illustrates a spring 140 that is like the spring of FIG. 3, except that it has an additional third arm set comprising two spring arms 142 and 144. Each of the arms 142 and 144 have an end connector, 146 and 148 respectively. Therefore, in addition to providing the spring connections provided by the embodiment of FIG. 3, the embodiment of FIG. 5 allows a third body to be sprung to the casing by the spring arms 142 and 144. Alternatively, the third set of arms could also be connected to the piston. In that case, the piston would have both a spring to ground and a spring to the displacer.

Figure 6:
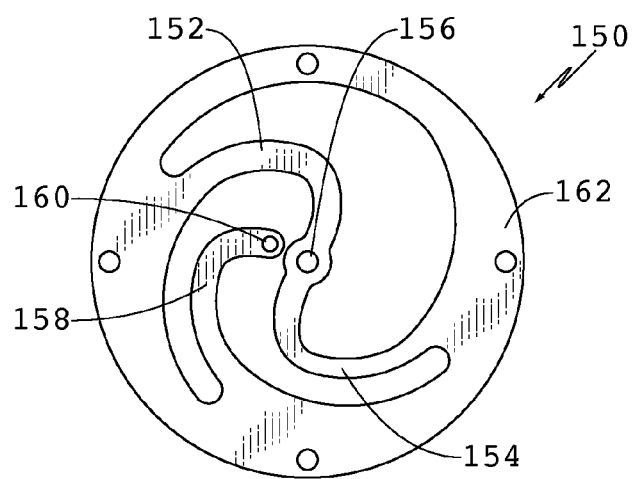
FIG. 6 is a top plan view of an alternative embodiment of the invention.

FIG. 6 illustrates a spring 150 which is like the spring of FIG. 1 except that it has a secondary arm set that comprises only one secondary spring arm. Like the embodiment of FIG. 1, the embodiment of FIG. 6 has a primary arm set comprising primary arms 152 and 154 that join at a common central connector 156. However, the embodiment of FIG. 6 has only one secondary arm 158 with an end connector 160. The arm 158 is connected to a second reciprocating body to spring the second body to the body to which the peripheral frame 162 is mounted. Although a secondary arm set that has only one spring arm can not be expected to provide a centering force that is as uniform in all radial directions as an arm set with multiple spring arms, it will provide some centering force. The embodiment of FIG. 6 can be used with its secondary arm 158 connected to the piston of a Stirling machine in those Stirling machines where the piston is maintained in sufficient axial alignment by its cylinder.

Figure 7:
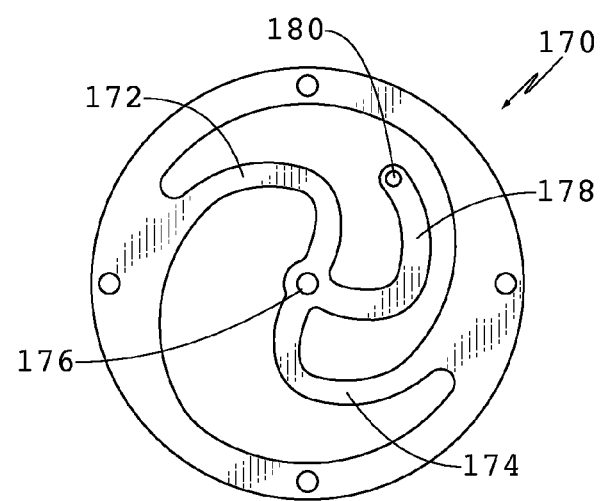
FIG. 7 is a top plan view of an alternative embodiment of the invention.

FIG. 7 illustrates a spring 170 which is like the spring of FIG. 3 except that it has a secondary arm set that comprises only one secondary spring arm. Like the embodiment of FIG. 3, the embodiment of FIG. 7 has a primary arm set comprising primary arms 172 and 174 that join at a common central connector 176. However, the embodiment of FIG. 7 has only one secondary arm 178 with an end connector 180. The arm 178 is connected to a first reciprocating body and the central connector 176 is connected to a second reciprocating body to spring the first body to the second body. Although, as described above, a secondary arm set that has only one spring arm is unlikely to provide a centering force that is as uniform in all radial directions as an arm set with multiple spring arms, it will provide some centering force. The embodiment of FIG. 7 can be used with its secondary arm 178 connected to the piston of a Stirling machine in those Stirling machines where the piston is maintained in sufficient axial alignment by its cylinder.

Figure 8:
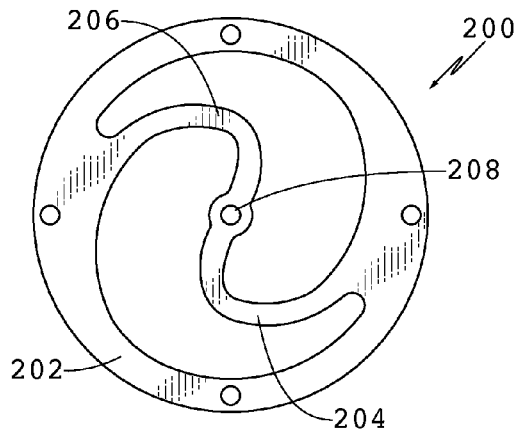
FIG. 8 is a top plan view of a component part of an alternative embodiment of the invention.
Figure 9:
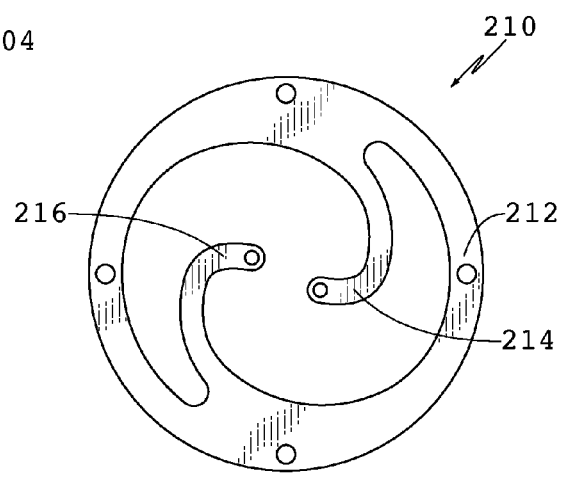
FIG. 9 is a top plan view of a second component part that is to be joined with the component of FIG. 8 to form an alternative embodiment of the invention.
Figure 10:
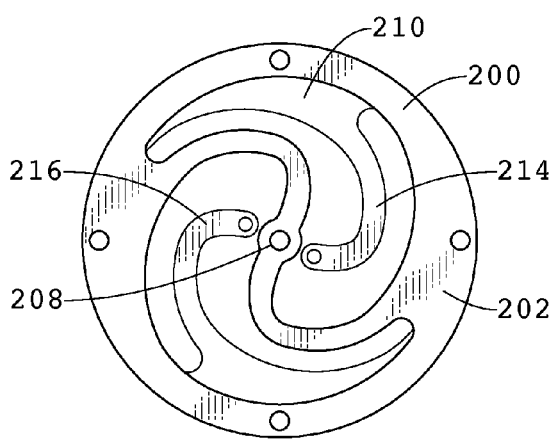
FIG. 10 is a top plan view of the assembled components of FIGS. 8 and 9 to form an alternative embodiment of the invention.
Figure 11:
FIG. 11 is a side view of the assembled components of FIG. 10.

FIGS. 8 through 11 illustrate that an embodiment of the invention can be constructed by forming a primary set of arms on one sheet of resilient material, forming a secondary set of arms on a second sheet of resilient material and then attaching the two sheets together to form a single spring embodying the invention. FIG. 8 shows a spring 200 having a peripheral frame 202, a primary arm set comprising spring arms 204 and 206 joined at a common central connector 208. FIG. 9 shows a spring 210 having a peripheral frame 212 and a secondary arm set comprising arms 214 and 216. Preferably and conveniently, but not necessarily, the springs 200 and 210 have similarly sized peripheral frames 202 and 212 and outer edges of the same diameter. As illustrated in FIGS. 10 and 11, the springs 200 and 210 are laid or laminated side by side and attached together on a body, such as a machine casing, to form a spring embodying the present invention. As a unit, the embodiment of FIGS. 10 and 11 form a spring that is like the spring of FIG. 1, except it comprises two layers instead of one.

Figure 12:
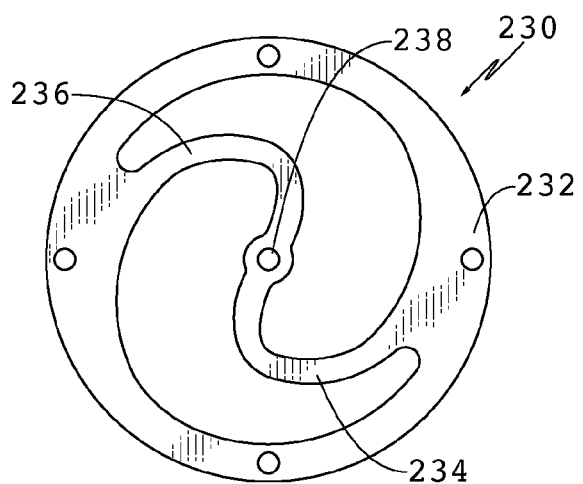
FIG. 12 is a top plan view of a component part of another alternative embodiment of the invention.
Figure 13:
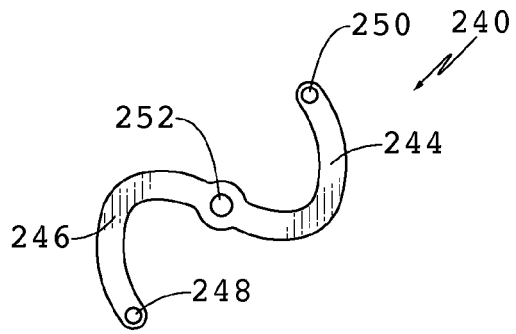
FIG. 13 is a top plan view of a second component part that is to be joined with the component of FIG. 12 to form an alternative embodiment of the invention.
Figure 14:
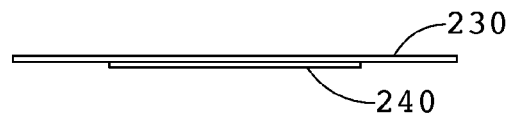
FIG. 14 is a side view of the assembled component of FIGS. 12 and 13 to form an alternative embodiment of the invention.

FIGS. 12 through 14 illustrate the same principle that an embodiment of the invention can be constructed by forming some of the arms on one sheet of material, other arms on one or more other sheets of material and then attaching all the sheets together for form a single spring embodying the invention. For example, a primary set of arms can be formed on one sheet of material, and a secondary set of arms can be formed on a second sheet of material. Attaching the two sheets together forms a single spring embodying the invention. FIG. 12 shows a spring 230 having a peripheral frame 232 and a primary arm set comprising spring arms 234 and 236 joined at a common central connector 238. The spring 230 is the same as the spring 200 of FIG. 8. FIG. 13 shows a spring 240 that has no peripheral frame but has a secondary arm set comprising arms 244 and 246 each with an end connector 248 and 250 and joined together at a central connector 252. As illustrated in FIG. 14, the springs 230 and 240 are laid or laminated side by side and attached together on a body, such as a displacer connecting rod, by a fastener inserted through the respective central connectors 238 and 252 to form a spring embodying the present invention. As a unit, the embodiment of FIGS. 12 through 14 forms a spring that is like the spring of FIG. 3, except it comprises two layers instead of one. In those embodiments in which the spring arms are formed on multiple sheets of material, there can be a small spacing between the sheets. For example, the multiple spring component sheets can be clamped together with a gasket-like material between them. Alternatively, they can be separately mounted with only a small gap of air between them. However, the spacing between the sheets must be kept small or the advantages of the invention will be lost. The measure of "small" is that the distance between the sheets is small enough that the arms of each set of arms can independently pass through openings between the arms of all other sets of arms. Any separation between the sheets that is larger than that loses the principal benefit of the invention.

In the most preferred embodiments of the invention, each set of arms has at least two arms so the radial forces are balanced and have a resultant radial force of zero when centered. As described and shown above, a set can have one arm. A set can also have three or more, equi-angularly spaced arms for each set. Preferably each arm in a set is identical to the other arms in its set so it is easy to make their centering resultant force zero when centered.

The preferred embodiments of the invention are planar when in their relaxed condition. However it is also possible to form embodiments that are three dimensional by disposing the arms so they also extend in an axial direction out of the plane of the peripheral frame such as by bending them in an axial direction beyond their elastic limit. This modification provides a spring bias in the axial direction for each such bent spring arm set. All the arms can extend axially in the same axial direction so they are contoured or bent so that in a relaxed condition they extend in the same direction out of the plane of the peripheral frame. Alternatively, the arms of one set can extend in one axial direction and the arms of the other set can extend in the opposite axial direction. For example, one set of arms can extend above the plane of the peripheral frame and the other set extend below the plane of the peripheral frame.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A flexure bearing spring capable of springing multiple bodies, the spring having a peripheral frame and a central axis perpendicular to the peripheral frame, the spring comprising:
  (a) a primary arm set comprising a plurality of primary spring arms separated from each other by openings, each primary arm extending inwardly from the peripheral frame along a non-radial primary path progressing inwardly toward the central axis and angularly about the central axis to a primary end connector; and
  (b) a secondary arm set comprising at least one secondary spring arm, each secondary arm extending along a non-radial secondary path progressing radially and angularly about the central axis to a secondary end connector, each secondary arm being interposed in an opening between the primary arms so that the arms of each set can independently pass through the openings between the arms of the other set.

2. A flexure bearing spring in accordance with claim 1 wherein the primary arms are equi-angularly spaced about the central axis and the secondary arm set comprises at least two secondary arms, each secondary arm extending inwardly from the peripheral frame, the secondary arms being equi-angularly spaced about the central axis and interposed in the openings between the primary arms.

3. A flexure bearing spring in accordance with claim 2 wherein the arms of one set of arms join at a central connector.

4. A flexure bearing spring in accordance with claim 3 wherein all arms are curved.

5. A flexure bearing spring in accordance with claim 4 wherein there are two sets of arms and each set has two arms.

6. A flexure bearing spring in accordance with claim 2 wherein the arms have one connector for each arm.

7. A flexure bearing spring in accordance with claim 6 wherein all arms are curved.

8. A flexure bearing spring in accordance with claim 7 wherein there are two sets of arms and each set has two arms.

9. A flexure bearing spring in accordance with claim 1 wherein the primary arms are equi-angularly spaced about the central axis and join at a central connector, and the secondary arm set comprises at least two secondary arms, each secondary arm extending outwardly from the central connector, equi-angularly spaced about the central axis and interposed in the openings between the primary arms.

10. A flexure bearing spring in accordance with claim 9 wherein all arms are curved.

11. A flexure bearing spring in accordance with claim 10 wherein there are two sets of arms and each set has two arms.

* * * * *